Nov. 3, 1964 V. ORDORICA ETAL 3,154,946
DIGITAL REMOTE POSITION INDICATOR
Filed Jan. 16, 1961 3 Sheets-Sheet 2
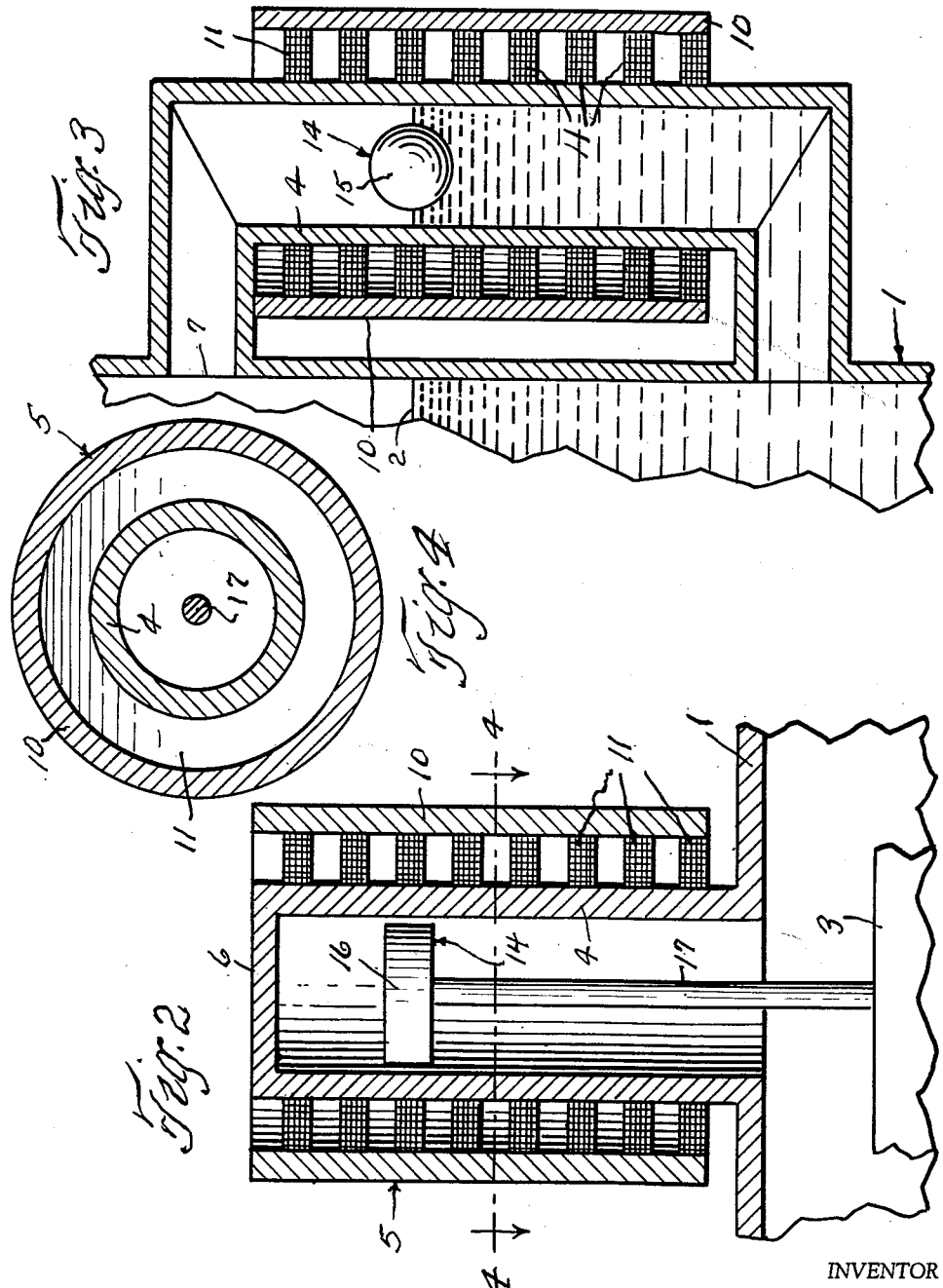
INVENTOR
VINCENT ORDORICA
FRED MORITZ
LIONEL LEAVITT
BY *Borst & Borst*
ATTORNEYS

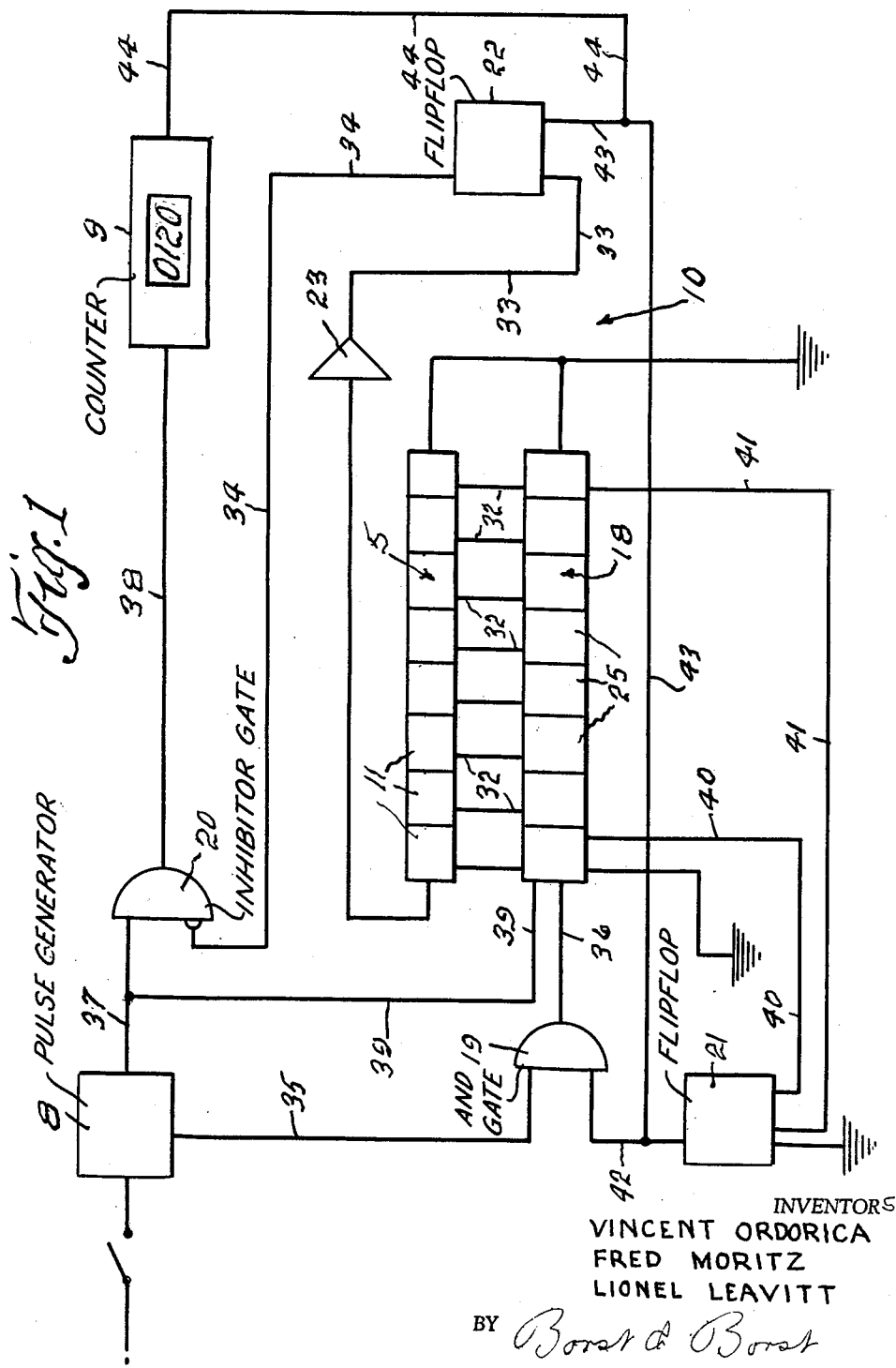

United States Patent Office 3,154,946
Patented Nov. 3, 1964

3,154,946
DIGITAL REMOTE POSITION INDICATOR
Vincent Ordorica, Brooklyn, Fred Moritz, Forest Hills, and Lionel Leavitt, Flushing, N.Y., assignors to Sperry Rand Corporation, Ford Instrument Company Division, Wilmington, Del., a corporation of Delaware
Filed Jan. 16, 1961, Ser. No. 83,047
10 Claims. (Cl. 73—313)

This invention relates to an apparatus for providing digital indication of the condition of a body which is located in an area not easily accessible. It is particularly adapted for digitally indicating element position, a liquid level, in a reactor pressurizer where the element whose position is to be measured is located within a closed container of non-magnetic stainless steel. Although the invention is shown and described herein in connection with a non-magnetic stainless steel reactor pressurizer, it is to be understood that the invention is not limited to such use as it may also be used in connection with various other types of apparatus where the element whose position is to be measured is located at a remote point and/or in an inaccessible position.

The principal object of the invention is to provide an improved indicating mechanism for visually indicating the position of a body which is located at a remote location and/or in an inaccessible location.

Another object of the invention is to provide an indicating mechanism of the aforesaid character which imparts digital rather than analogue information.

Another object of the invention is to provide an indicating mechanism of the aforesaid character which utilizes a digital sensing unit and a conventional transistorized digital counter in conjunction with an all digital scanning and read-out circuitry.

Still another object of the invention is to provide an indicating mechanism of the aforesaid character which is not dependent for accuracy upon operating ambient temperature, or upon normal variations in line voltage and frequency.

As shown and described herein the apparatus comprises generally a digital sensing unit, a pulse generator, a conventional transistorized decimal counter, and scanning circuitry. The pulse generator continuously emits "driving" and "set" pulses at a predetermined frequency. The driving pulses are imparted to the counter by the scanning circuitry in accordance with the condition of the sensing element which is dependent on the position of a body, each "driving" pulse advancing the counter one increment. The operation of the scanning circuitry is cyclic, so that "drive" pulses are counted in recurring cycles having a fixed repetition rate. At the end of each counting cycle the counter is reset to initial position and a new cycle initiated.

The scanning circuitry comprises a magnetic shift register which is operatively connected to the digital sensing unit; an "and" gate which controls the imparting of "set" pulses to the shift register; an inhibitor gate which controls the imparting of "drive" pulses to the counter; a "stop pulse" flipflop which controls the setting of the "inhibitor gate" to permit or prohibit the imparting of "drive" pulses to the counter; a "stop" pulse amplifier which controls the inhibitor gate in accordance with the condition of the digital sensing unit; and a "set" pulse timing flipflop which controls the resetting of the "and" gate to permit a new "set" pulse to be imparted to the shift register upon the initiation of each new counting cycle.

The sensing unit comprises a plurality of small transformers each having a primary and a secondary winding which are wound one upon the other with the secondary windings thereof all connected in series. The transformers are mounted upon a nonmagnetic stainless steel standpipe in axial alignment, and are spaced a finite distance apart. The number and spacing of the transformers upon the standpipe are dependent upon the required accuracy of position indication. The lower end of the standpipe is secured to and communicates with the interior of the reactor container and the upper end thereof is closed to the ambient atmosphere, either by a cap, or by being also connected to the reactor container in communication with the interior thereof. A magnetic stainless steel armature is disposed within the standpipe for up and down movement therein in accordance with varying positions of the parameter being measured. If the apparatus is being used to indicate liquid level in the reactor vessel the armature may be in the form of a spherical float; and if the apparatus is being used to indicate element position within the vessel the armature may be a disk which is connected to the element by an axially disposed rod.

The magnetic shift register, which is a conventional one core per bit unit, comprises a plurality of stages, one stage for each transformer mounted on the standpipe. Each stage comprises a ring shaped core having wound thereon a "set" pulse input and a "set" pulse output winding, a "drive" pulse winding, and a "stage" output winding. The "set" pulse output winding on each core is connected to the "set" pulse input winding on the next succeeding core through a diode, resistor and capacitor combination interposed therebetween; the "drive" pulse windings on the various cores are all connected together in series, and the stage output winding on each core is connected to the primary winding of the corresponding sensor transformer.

The input "set" winding of the first stage receives a "set" pulse at the start of every scanning cycle which sets the first stage core to "one." The first drive pulse thereafter changes the state of the first stage core from "one" to "zero," and the voltage generated thereby across one of the output windings charges the capacitor interposed between the first and second stages. During the interval between "drive" pulses the capacitor discharges through the input "set" winding of the second stage which sets the second stage core to "one," and which will be reset to "zero" by the next "drive" pulse. This sequence of events is successively repeated from stage to stage until the "one" introduced into the first stage core is cleared out of the register through the last stage core.

As the "set" pulse is advanced from core to core by the "drive" pulses it successively energizes the "stage" output windings which in turn energizes the primary windings of the successive corresponding sensor transformers. As each transformer primary winding is energized, it in turn energizes the associated secondary winding. The voltages from the transformer secondary windings, which are all connected together in series, are imparted to the "stop" pulse amplifier. It will therefore be seen that the "one" which is sequentially propagated through the shift register stages is also sequentially propagated through the sensor transformers, it being understood that there is a sensor transformer for each shift register stage.

Whenever the magnetic armature is in alignment with a particular sensor transformer it becomes part of the magnetic circuit of that transformer and couples the primary and secondary windings thereof, thereby, reducing the reluctance in the magnetic circuit. This increases the amplitude of the pulses from that particular transformer over and above what they would have been had the magnetic armature not been present. It is this change in the amplitude of the pulses from a particular transformer with which the magnetic armature is aligned that is utilized in the setting of the counter in accordance with armature position.

The operation of the invention will now be generally described, it being understood, as previously stated, that the operation of the apparatus is cyclic in that "driving" pulses which are counted to indicate the position of a parameter being measured are successively counted in cycles and that at the end of each counting cycle the entire mechanism is automatically reset to initiate a new counting cycle. At the beginning of each counting cycle a "set" pulse from the pulse generator is imparted to the core of the first stage of the shift register which changes the core thereof from "zero" to "one" and changes the state of the "set" pulse flip-flop from "one" to "zero" thereby closing the "and" gate to prevent further "set" pulses being imparted to the shift register until the initiation of the next counting cycle. Successive "drive" pulses from the pulse generator, at a frequency determined by the required scanning frequency, advance the "set" pulse through the successive stages of the shift register. Therefore the magnetic cores of successive stages are sequentially set to "one," when the "set" pulse enters the next succeeding stage, and return to "zero" when the pulse is driven from it to the next succeeding stage. The primary windings of the sensor transformers are energized by the corresponding stage output windings of the shift register stages. As the shift register cores change from a "one" to "zero," they induce a voltage in corresponding transformer primaries. The amplitude of the secondary voltage of a particular transformer is determined by its position with respect to the magnetic armature. If the armature position is such that it is part of its magnetic circuit, the output of this transformer is higher than the output of the rest of the transformers in the sensor. The secondaries of the transformers are connected in series to the "stop" pulse amplifier which triggers the stop count flipflop when the pulse amplitude is greater than a predetermined level.

The "drive" pulses which advance the "set" pulse through the shift register, and therefore through the transformer primaries, also actuate the counter through an inhibitor gate which remains open until the stop pulse amplifier triggers the stop count flipflop and places an inhibit signal on the gate. As a result, the display counter indicates the number of drive pulses required to shift the "set" pulse from the zero level transformer to the transformer located in line with the present armature position. As the separation between transformers is definite, the "drive" pulse count can be translated into inches of level.

When the "set" pulse reaches the last stage of the shift register, the output of this stage changes the state of the "set" pulse timing flipflop from "zero" to "one". The "one" of this fliflop performs the following functions: (a) enables a new "set" pulse to pass through the "and" gate into the shift register, (b) resets the stop count flipflop to remove the inhibiting pulse from the counter gate and (c) resets the display counter to "zero."

Having stated the principal objects of the invention and generally described the construction and operation of the invention, other and more specific objects of the invention, and a more comprehensive understanding of the invention will be apparent from the following specification and the accompanying drawing forming a part thereof, in which the construction, arrangement, function, and operation of the various elements are specifically described. In the drawings:

FIG. 1 is a block diagram of an indicating apparatus embodying my invention;

FIG. 2 is a fragmentary sectional view illustrating the construction of a sensing unit such as used in indicating the position of a shiftable element in a reactor pressurizer container or vessel of nonmagnetic stainless steel;

FIG. 3 is a view similar to FIG. 2 illustrating the construction of a sensing unit such as used in indicating the liquid level in a nonmagnetic reactor pressurizer container;

FIG. 4 is a horizontal section taken on the line 4—4 on FIG. 2; and

Figure 5:
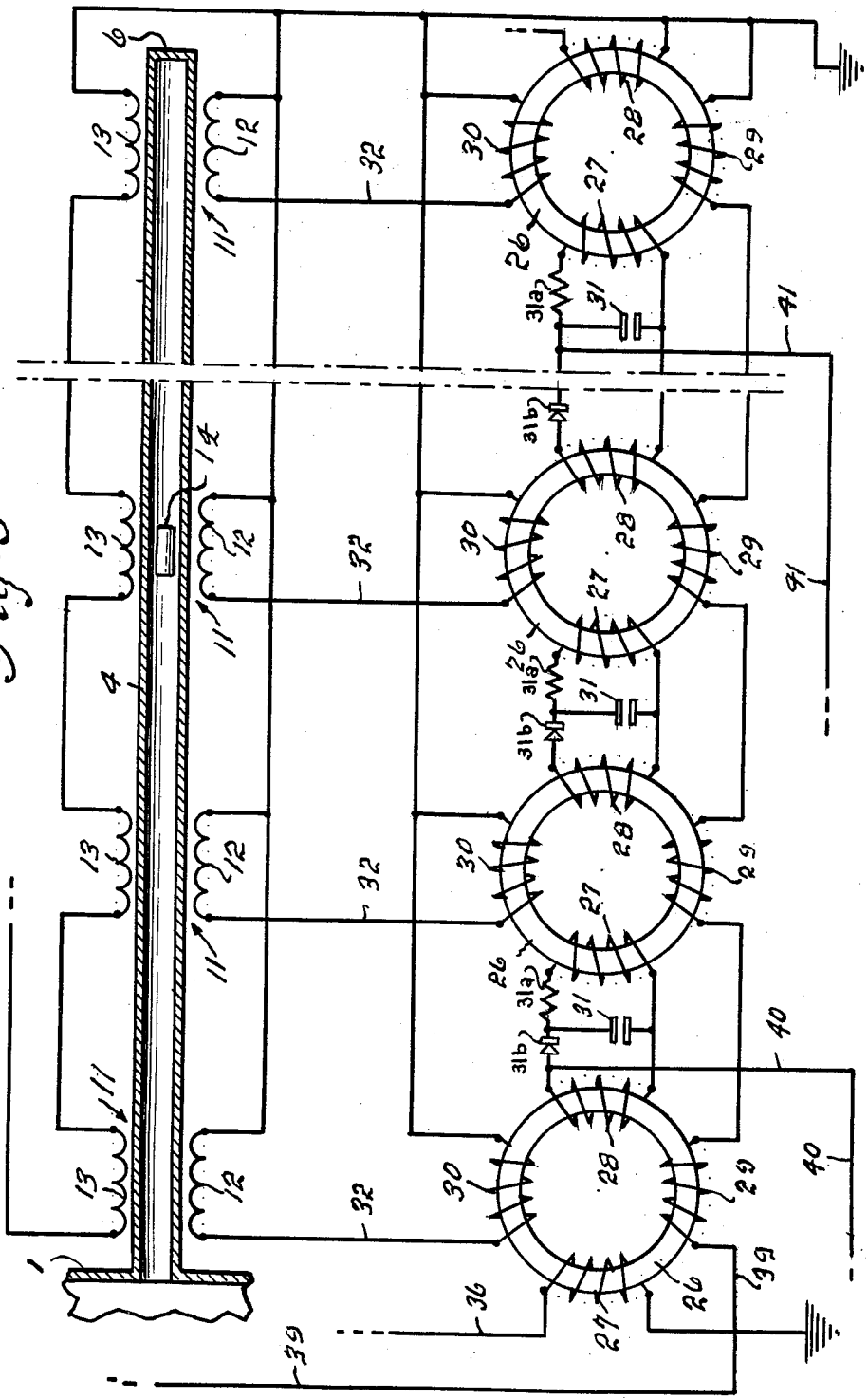
FIG. 5 is a diagrammatic view illustrating the construction of the magnetic shift register in conjunction with the sensing element windings.

Referring now to the drawings by reference characters, the numeral 1 indicates the closed nonmagnetic stainless steel container, of a reactor pressurizer, having inclosed therein a shiftable body whose varying position during operation is to be constantly measured and visibly indicated. The body may be the liquid level 2 within the container, as shown in FIG. 3, or it may be a movable element 3 of the apparatus within the container as shown in FIG. 2. The container 1 is provided with a nonmagnetic tubular standpipe 4 which constitutes part of a digital position sensing unit generally indicated by the numeral 5. The lower open end of the standpipe 4 is secured to the container 1 in communication with the interior thereof and the upper end of the standpipe is closed to the ambient atmosphere, either by an end wall or cap 6 as shown in FIG. 2 or by also being connected into the container 1 as shown at 7 in FIG. 3.

The measuring and indicating apparatus comprises generally the digital position sensing unit 5, a pulse generator 8, a conventional transistorized decimal counter 9, and scanning circuitry.

The digital position sensing unit 5 comprises the standpipe 4 on which a plurality of axially aligned finitely spaced small transformers 11, having primary windings 12 and secondary windings 13, are wound within a magnetic stainless steel sleeve 10. The number and spacing of the transformers 11 are dependent upon the accuracy required of the apparatus. The greater the number of transformers and the closer the spacing thereof, the greater the accuracy of the apparatus. The secondary windings 13 of the transformers 11 are all connected together in series; and one side of each transformer primary winding 12 is connected into a magnetic shift register as will be hereinafter described. A magnetic stainless steel armature 14 is disposed within the standpoint 4 for up and down movement therein in accordance with varying positions of the parameter being measured. When the apparatus is used for measuring and indicating liquid level the armature 14 may be in the form of a spherical float 15 as shown in FIG. 3; and when the apparatus is being used to indicate the position of a movable element within the container the armature 14 may be in the form of a disk 16 which is connected to the element 3 by a rod 17 as shown in FIG. 2. As the liquid level 2 rises and falls the float 15 will rise and fall with it; and the disk 16 will be moved up and down within the standpipe 4 in unison with the up and down movement of the element 3. Whenever the armature 14 is in alignment with a particular transformer 11, on the standpipe 4, it becomes part of the magnetic field of that transformer and couples the primary and secondary windings thereof thereby reducing the reluctance in its magnetic circuit, which increases the amplitude of the pulses from that particular transformer over and above what they would have been had the armature 14 not been present. It is this change in the amplitude of the pulses from a particular transformer 11 with which the armature 14 is associated, that is utilized in the setting of the counter 9 in accordance with the parameter position.

The pulse generator 8 is a conventional transistorized generator having a free running multivibrator, a "set" pulse output, and a "drive" pulse output, from which two pulse trains are obtained. One output train consists of the "drive" pulses which feed the series connected "drive" windings 29 of a shift register 18, and the other train consists of "set" pulses which energize the input winding of the first stage of the magnetic shift register 18, through the "and" gate 19, as will be hereinafter described.

The counter 9 is a conventional decimal counting unit utilizing transistor circuitry. Four binary stages are cascaded with feedback loops from the fourth to the third and the third to the second stages. This feedback changes the fourth and sixth counts so that the normal scale of sixteen counter resets after the ninth count. The counter is adapted to be automatically reset to initial position after each scanning or counting cycle.

The scanning circuitry comprises a magnetic shift register which is generally indicated by the numeral 18, an "and" gate 19, an "inhibitor" gate 20, a "set" pulse timing flipflop 21, a stop count flipflop 22, and a stop pulse discriminator amplifier 23.

The magnetic shift register 18 consists of a plurality of similar stages 25, there being one stage for each transformer of the sensing unit. Each stage 25 comprises a ring shaped core 26 having wound thereon a "set" pulse input winding 27 and a "set" pulse output winding 28, a "drive" pulse input winding 29, and a stage output winding 30. The "set" pulse output winding 28 on each core is connected to the "set" pulse input winding on the next succeeding core, through a diode 31b, resistor 31a and a capacitor 31 combination interposed therebetween. The "drive" pulse windings 29 on the various cores are all connected together in series, and the stage output winding 30 on each core is connected to one side of the primary winding 12 of the associated transformer 11 of the sensing unit 5 by a conductor 32; all as shown in FIG. 5. The "set" pulses from the pulse generator 8 are imparted to the "set" pulse input winding 27 on the core 26 of the first stage 25; and the "drive" pulses from the pulse generator 8 are imparted to the shift register 18 through the "drive" pulse windings 29.

The "and" gate 19, which is a conventional diode gate followed for impedance matching purposes by a transistor buffer stage, is provided to control the admission of "set" pulses to the shift register 18.

The "inhibitor" gate 20, which is provided to control the admission of "drive" pulses from the pulse generator 8 to the counter 9, is a conventional transistor switching gate which will pass pulses if an inhibit signal is not present. But an inhibit signal, when received from the stop count flipflop 22, will saturate the transistor and prevent the passing of pulses through the gate to the counter.

The stop pulse discriminator and amplifier 23 is of conventional construction and comprises an amplifier stage followed by transistor switching stage.. The amplifier stage is provided in order to increase the relatively low signal level which is imparted thereto from the secondary winding of a sensing unit transformer 11 when the primary winding 12 and the secondary winding 13 thereof are coupled by the armature 14. The quiescent output signals of the secondary windings 13 of the transformers 11, when the primary and secondary windings thereof are uncoupled by the armature 14, is eliminated by the proper biasing of the transistor switching stage. Therefore there will be no output from the stop pulse discriminator and amplifier 23 except when the primary and secondary windings of a transformer 11 are coupled by the armature 14. The amplified output voltage from the stop pulse discriminator and amplifier 23 is imparted to the stop pulse flipflop 22 through a conductor 33.

The stop pulse flipflop 22 and the set pulse timing flipflop 21 are both of conventional construction. The stop pulse timing flipflop 22 is provided to control the operation of the inhibitor gate 20. Whenever a voltage is imparted to the stop pulse flipflop 22 from the stop pulse discriminator and amplifier 23 it triggers the stop pulse flipflop 22 and causes it to impart an inhibitor signal to the inhibitor gate 20, through the conductor 34, which prevents the passing of "drive" pulses from the pulse generator 8 to the counter 9.

The set pulse timing flipflop 21 is provided to; (A) control the operation of the "and" gate 19 to admit a "set" pulse from the pulse generator 8 to the first stage of the shift register 18 at the beginning of each counting cycle, and thereafter prevent the admission of "set" pulses thereto until the beginning of the next counting cycle; (B) reset the stop count flipflop 22 at the end of each counting cycle to remove the inhibiting signal from the inhibitor gate 20, and; (C) to reset the counter 9 to "zero" at the end of each counting cycle.

The operation of the apparatus, having been generally described, will now be specifically described with the use of reference characters, reference being had to FIG. 1 of the drawing. At the beginning of each counting cycle a "set" pulse from the pulse generator 8 is imparted through the conductors 37 and 39 to the drive pulse wind- "and" gate 19 passes this "set" pulse through the conductor 36 to the input winding 27 of the first stage 25 of the magnetic shift register 18. At the same time "drive" pulses are imparted to the inhibitor gate 20 through the conductor 37, and from the inhibitor gate 20 through the conductor 38 to the display counter 9. Drive pulses are also simultaneously imparted from the pulse generator 8 through the conductor 37 and 39 to the drive pulse winding 29 on the core 26 of the first stage 25 of the magnetic shift register 18. The "set" pulses are then propagated through the magnetic shift register 18 from the first stage 25 thereof to the last stage 25 thereof by the "drive" pulses at a repetition frequency determined by the required scanning frequency. The magnetic cores 26 are therefore sequentially set from "zero" to "one" when a drive pulse enters a stage, and returned to "zero" when a "set" pulse is driven from one stage to the next succeeding stage by the drive pulses until the "set" pulse reaches the last stage of the magnetic shift register 18. The stage output winding 30 on each core 26 energizes the corresponding primary winding 12 on each transformer 11 as the set pulse is propagated through the various stages 25 of the magnetic shift register 18. Therefore the "set" pulse which is sequentially propagated through the successive stages of the magnetic shift register 18 is also sequentially propagated through the primary windings on the successive transformers 12 of the sensing unit 5. The "set" pulse which is imparted to the first stage of the shift register through the "and" gate 19 is also imparted to the "set" pulse timing flipflop 21 through the conductor 40 which triggers it so that it sets the "and" gate to prevent the passage of any more "set" pulses to the shift register until the initiation of the next counting cycle. Whenever the "set" pulse being propagated through the shift register 18 and sensing unit 5 energizes the primary winding 12, of a transformer 11, which is coupled to the secondary winding 13 thereof by the armature 14, the stop pulse discriminator and amplifier 23 imparts a voltage to the stop count flipflop 22 which causes it to impart an inhibitor signal to the inhibitor gate 20 which stops the admission of drive pulses to the display counter 9. As a result the display counter 9 indicates the number of drive pulses required to shift the "set" pulse from the "zero" level transformer 11 to the transformer having the primary and secondary windings 12 and 13 thereof coupled by the armature 14. As the "separation" between the transformers 11 is definite, the "drive" pulse count can be translated into inches or other increments of the position of the armature 14.

When the "set" pulse reaches the last stage of the shift register the last stage imparts a signal, through the conductor 41, to the "set" pulse timing flipflop 21 which resets it to its "on" condition. The set pulse timing flipflop 21 then, through the conductor 42, resets the "and" gate 19 to pass a new "set" pulse to the first stage of the shift register. At the same time the "set" pulse timing flipflop also, through the conductors 42 and 43 resets the stop count flipflop 22 to remove the inhibitor signal from the inhibitor gate 20, and through the conductors 42, 43 and 44 resets the display counter 9 to zero. A new "set" pulse is then imparted to the shift register to initiate a new counting cycle. This sequence of operations is successively repeated at a frequency determined by the pulse generator.

From the foregoing it will be apparent to those skilled in this art that we have provided a very simple and efficient mechanism for accomplishing the objects of the invention.

It is to be understood that we are not limited to the specific construction shown and described herein as various modifications may be made therein within the spirit of the invention and the scope of the appended claims.

What is claimed is:

1. An indicating mechanism of the character described comprising a display counter; a sensing unit, means by which said sensing unit is adapted to be coupled to an element the varying position of which is to be measured and by which the condition of said sensing unit is varied in accordance with varying positions of said element; a magnetic shift register operatively associated with said sensing unit; a pulse generator by which set pulses and drive pulses are generated at a predetermined frequency; an inhibitor gate through which drive pulses are adapted to be imparted to said display counter, each drive pulse imparted to said display counter being operative to advance said counter one increment; an "and" gate through which set pulses are adapted to be imparted to said magnetic shift register; means through which said drive pulses are also imparted to said magnetic shift register; said drive pulses imparted to said magnetic shift register being operative to sequentially advance set signals through said shift register; said "and" gate being operative to prohibit the imparting of a new set pulse to said shift register until a previously imparted set pulse has been cleared out of said shift register; said inhibitor gate being operative to permit or prohibit the imparting of drive pulses to said display counter; and means by which said set pulses are operative through said shift register to cause said sensing unit, under certain conditions thereof in accordance with element postion, to impart an inhibit signal to said inhibitor gate to stop the further imparting of drive pulses to said counter.

2. An indicating mechanism as defined by claim 1 in which said last mentioned means includes a stop count flipflop interposed between said sensing unit and said inhibitor gate through which inhibit signals from said sensing unit are imparted to said inhibitor gate.

3. An indicating mechanism as defined by claim 2 in which said last mentioned means also includes a stop count discriminator and amplifier by which said inhibit signals are amplified, said discriminator and amplifier being interposed between said sensing unit and said stop count flipflop.

4. An indicating mechanism as defined by claim 3 in which a set pulse timing flipflop is provided by which said mechanism including said stop count flipflop is set to initial condition as each set pulse is cleared from said shift register, said set pulse timing flipflop being connected at its input to said register and at its output to said "and" gate, said display counter and said stop count flipflop.

5. An indicating mechanism as defined by claim 1 in which said sensing unit comprises a standpipe of non-magnetic material, a plurality of finitely spaced small transformers having primary and secondary winding wound on said standpipe, a magnetic armature disposed in said standpipe for up and down movement therein, the magnetic armature assuming a position corresponding to the variable position of said element, the secondary winding of said transformers being all connected in series, and the primary winding of each of said transformers having one side thereof connected to said magnetic shift register.

6. An indicating mechanism as defined by claim 5 in which said magnetic shift register comprises a plurality of stages, there being one stage associated with each transformer of said sensing unit.

7. An indicating mechanism as defined by claim 6 in which each stage of said shift register comprises a ring shaped core having wound thereon a set pulse input winding and a set pulse output winding, a drive pulse winding, and a stage output winding, with the set pulse output winding on each core connected to the set pulse input winding on the next succeeding core; the drive pulse windings of each of said cores all being connected together in series; and one side of each of said output windings of each stage being connected to the said one side of the associated primary winding of said sensing unit.

8. An indicating mechanism as defined by claim 7 in which said last mentioned means includes a stop count flipflop interposed between said sensing unit and said inhibitor gate through which inhibit signals from said sensing unit are imparted to said inhibitor gate.

9. An indicating mechanism as defined by claim 8 in which said last mentioned means also includes a stop count discriminator and amplifier by which said inhibit signals are amplified, said discriminator and amplifier being interposed between said sensing unit and said stop count flipflop.

10. An indicating mechanism as defined by claim 9 in which a set pulse timing flipflop is provided by which said mechanism including said stop count flipflop is set to initial condition as each set pulse is cleared from said shift register, said set pulse timing flipflop being connected at its input to said register and at its output to said "and" gate, said display counter and said stop count flipflop.

References Cited in the file of this patent

UNITED STATES PATENTS

| | | |
|---|---|---|
| 2,846,669 | McMillan et al. | Aug. 5, 1958 |
| 2,853,878 | Anderson et al. | Sept. 30, 1958 |